(12) United States Patent
Harper (10) Patent No.: US 7,676,436 B2
(45) Date of Patent: Mar. 9, 2010

(54) DIGITAL CONTENT DISTRIBUTION SYSTEMS AND METHODS

(75) Inventor: Gregory W. Harper, New York, NY (US)

(73) Assignee: Trans World New York LLC, Albany, NY (US)

( * ) Notice: Subject to any disclaimer, the term of this patent is extended or adjusted under 35 U.S.C. 154(b) by 926 days.

(21) Appl. No.: 11/359,763

(22) Filed: Feb. 23, 2006

(65) Prior Publication Data

US 2006/0190410 A1    Aug. 24, 2006

Related U.S. Application Data

(60) Provisional application No. 60/654,951, filed on Feb. 23, 2005.

(51) Int. Cl.
*G06Q 99/00* (2006.01)
(52) U.S. Cl. .............................. 705/51; 705/57; 705/59; 705/64; 709/224; 709/238
(58) Field of Classification Search ............. 705/50–59; 709/238, 224
See application file for complete search history.

(56) References Cited

U.S. PATENT DOCUMENTS

| | | | |
|---|---|---|---|
| 5,914,941 A | 6/1999 | Janky | |
| 6,423,892 B1 | 7/2002 | Ramaswamy | |
| 6,671,818 B1 | 12/2003 | Mikurak | |
| 7,346,705 B2 * | 3/2008 | Hullot et al. | 709/238 |
| 7,403,769 B2 * | 7/2008 | Kopra et al. | 455/414.1 |
| 2001/0029605 A1 | 10/2001 | Forbes et al. | |
| 2002/0116277 A1 | 8/2002 | Kraft | |
| 2003/0093545 A1 | 5/2003 | Liu et al. | |
| 2003/0195760 A1 | 10/2003 | Kim et al. | |
| 2004/0002970 A1 | 1/2004 | Hur | |
| 2004/0102217 A1 | 5/2004 | Kacines | |
| 2004/0268006 A1 | 12/2004 | Kang et al. | |
| 2006/0095792 A1 | 5/2006 | Hurtado et al. | |
| 2006/0173996 A1 * | 8/2006 | Bates et al. | 709/224 |
| 2006/0184617 A1 * | 8/2006 | Nicholas et al. | 709/203 |
| 2006/0277598 A1 * | 12/2006 | Ahn | 726/5 |

FOREIGN PATENT DOCUMENTS

WO    WO 03/046827 A1    6/2003
WO    WO 2004/102568 A1    11/2004

OTHER PUBLICATIONS

"Digital Rights Management White Paper", Sonera Plaza Ltd, MediaLab, Feb. 3, 2002, pp. 1-14.
International Search Report and Written Opinion issued in PCT/US/07/15782 on Feb. 8, 2008, 10 pp.

* cited by examiner

*Primary Examiner*—Jalatee Worjloh
(74) *Attorney, Agent, or Firm*—Rothwell, Figg, Ernst & Manbeck, P.C.

(57) ABSTRACT

Embodiments of the present invention enable a user to acquire an item (e.g., a digital song, digital video, etc.) using one device (e.g., a portable device) and to easily move a copy of the acquired item from the one device to another device so that a user of the other device can play the item.

11 Claims, 10 Drawing Sheets

DIGITAL CONTENT DISTRIBUTION SYSTEMS AND METHODS

CROSS REFERENCE TO RELATED APPLICATIONS

This application claims the benefit of U.S. Provisional Patent App. No. 60/654,951, filed on Feb. 23, 2005, the contents of which are incorporated herein by this reference.

This application is related to (1) U.S. Provisional Patent App. No. 60/602,642, filed on Aug. 19, 2004; U.S. patent application Ser. No. 11/025,149, filed on Dec. 30, 2004 (status pending); and U.S. patent application No. 11/359,762, filed on Feb. 23, 2006. The contents of the above identified applications are incorporated herein by this reference.

BACKGROUND OF THE INVENTION

1. Field of the Invention

The invention relates generally to the distribution of digital content (e.g., digital music, videos, photographs, and other digital content) to portable devices (e.g., mobile phones, portable digital audio/video players, and other portable devices) and other devices.

2. Discussion of the Background

Digital content downloading systems have been deployed and designed to allow a registered user to download copyrighted content to the user's personal computer (PC). These systems restrict the user's usage of the content using what is called digital rights management (DRM) technology. While the usage restrictions vary by service, there is typically a restriction on the number and/or type of devices on which the downloaded content may be placed. For example, DRM technology may be used to prevent the user from transferring copies of content that have been legally downloaded to the user's PC onto more than five portable devices, but may allow the user to place the content on any networked device within a subnet or behind a router in the user's home media system (e.g., windows Media extender technology or windows media connect). These devices onto which the user may place DRM protected downloaded content are sometimes called "trusted machines."

Portable DRM strategies exist that allow a portable player, such as a music or video player or a cell phone, to associate itself with a single primary host computer that can transfer content and licenses to the portable device. In an effort to reduce piracy, some DRM technologies make it very difficult or even impossible to transfer into a portable device's content library content stored on a particular computer, unless the particular computer is the primary computer with which the portable device is associated. Thus, if a user wants to place into a content library of a portable device content that is stored on a computer other than the primary computer with which the portable device is associated, such as a computer in a retail store, some DRM systems would prohibit doing so as the retail store computer would not be a trusted device.

Most protected digital content services employ a license server that keeps track of the content purchased (or rented) from the content service so that in the case of a local data storage failure (hard drive crash—loss of portable player) the purchased content can be restored to the owner. The license server may track all purchases by user account, which may be accessed remotely by way of a data link and which may be protected by a user name and password.

Typically, these license servers also keep the unique ID's of the physical computers on which the licensed material is placed. The unique ID's are registered so that if there is a limit placed on the number of physical computers on which the content can be placed, there is a way to verify that the limit is not being exceeded.

In short, to be able to sell digital content at retail location and transfer the content directly onto a customer's portable device so that the content is included in the device's content library, the portable device must connect to a host computer at the retail location, which computer may not be within the "trusted list" of computers for the owner of the portable device. Thus, in some cases, it is not an easy task for an owner of a retail store to place digital content on a customer's portable device when the portable device is part of a DRM system that restricts the content that can be placed on the portable device and included in the content library of the portable device.

In addition, there are numerous different DRM schemes, and each portable device may have its own properties and capabilities. Thus, if the owner of a portable device were to take his or her portable device into a retail environment, the process of loading content onto that device would be extremely complex, forcing the user to go through many steps of identifying themselves, logging onto their account, choosing an encoding format for the content (e.g., WMA, AAC, Real audio etc.) selecting a DRM system (e.g. Windows Media DRM, Fairplay, etc.), etc.

Furthermore, once the purchased content is placed into the customer's portable device, the customer will most likely want to transfer a copy of the protected content onto the customer's home PC and obtain the necessary license so that he customer can "play" (e.g., listen to, view, read, interact with, or the like) the content on the home PC. Accordingly, there is a need to make such a transfer as easily as possible for the customer.

Other problems associated with placing content on a portable device also exist. The present invention aims to simplify the placing of content on portable devices and other devices.

SUMMARY OF THE INVENTION

Some embodiments of the present invention enable a user to acquire an item (e.g., a digital track, digital video, etc.) using one device (e.g., a portable device) and to easily move a copy of the acquired item from the one device to another device so that a user of the other device can play the item.

A method according to one embodiment includes the steps of: (a) connecting a first device to a second device, wherein the first device is a portable device; (b) while the portable device is connected to the second device, using the second device to submit a request to acquire an item; (c) after submitting the request and while the portable device is connected to the second device, receiving at the portable device an encrypted copy of the requested item and a license, and storing the encrypted copy of the requested item and the license on a first storage unit contained within or connected to the portable device, wherein the encrypted copy of the item has a header portion containing a pointer to a license server and a key-id, and the license enables a content player running on the portable device to play the encrypted item from the first storage unit; (d) after step (c), disconnecting the portable device from the second device; (e) after step (d), connecting the portable device to a third device; (f) after step (e), storing a copy of the encrypted item stored on the first storage unit in a content library stored in a second storage unit that is contained within or connected to the third device, wherein the second storage unit also contains a license store; (g) after step (f) and in response to a request to play the copy of the encrypted item stored in the second storage unit using a content player running on the third device, silently obtaining from the license server a license that enables the content player running on the third device to play the encrypted item from the second storage unit; and (h) storing the obtained license in the license store.

A method according to another embodiment includes the steps of: (a)-(f) as described above and the steps of silently obtaining from the license server a license that enables the content player to play the encrypted item from the second storage unit and storing the obtained license in the license store, wherein these steps are performed after step (e) and before a user of the third device attempts to use a content player to play a copy of the encrypted item from the second storage unit.

A method according to another embodiment of the invention includes the steps of: (a)-(c) as described above and the step of storing a helper application on the first storage unit after step (a) and prior the portable device being disconnected from the second device.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF PREFERRED EMBODIMENTS

As used herein, the words "a" and "an" mean "one or more."

Figure 1:
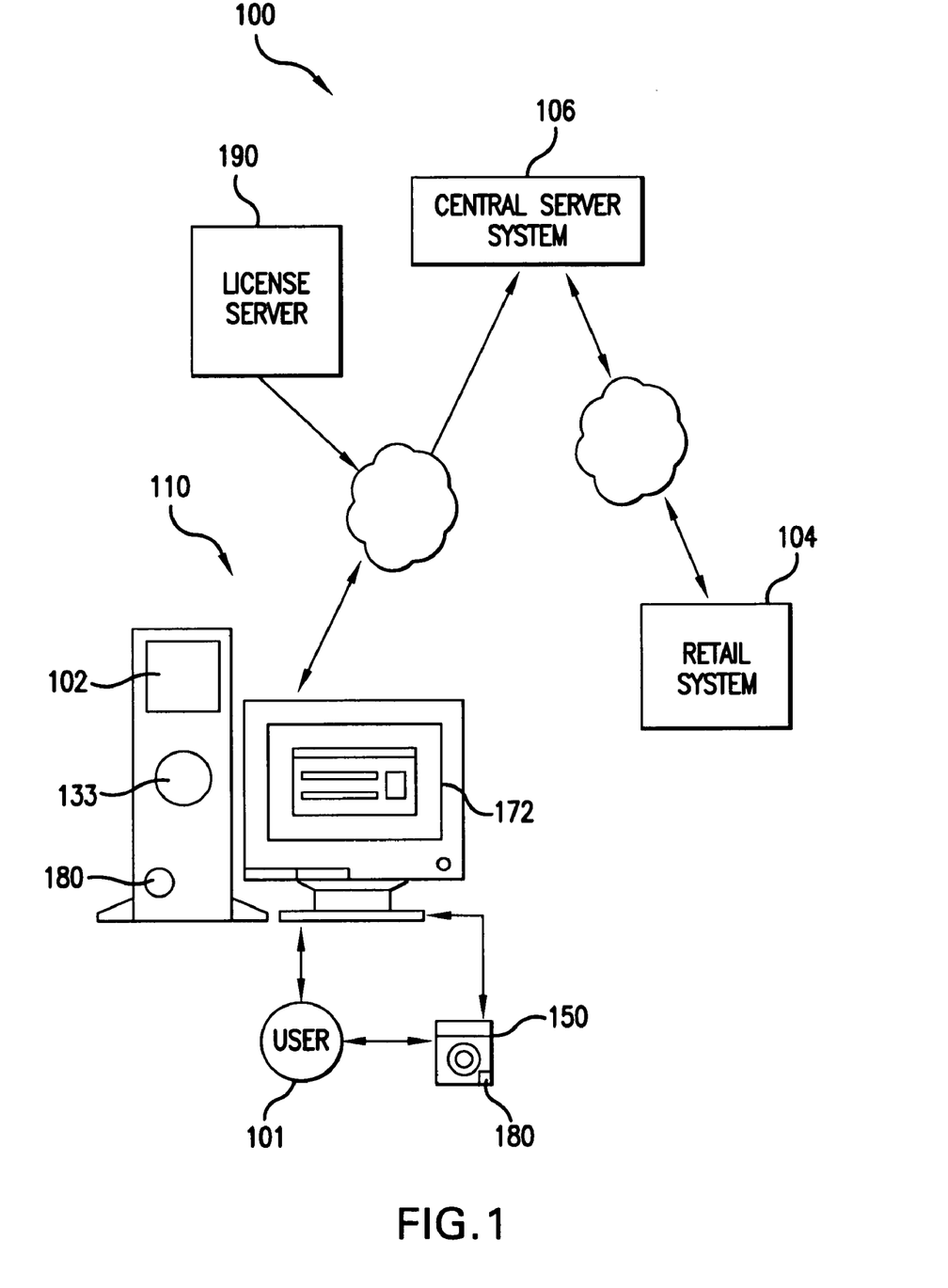
FIG. 1 illustrates a system 100 to facilitate the process of acquiring digital content at a retail location

FIG. 1 illustrates a system 100 to facilitate the process of acquiring digital content at a retail location. System 100 allows a user to easily add digital copy protected content to a portable device 150 and have that content automatically be part of a library of content 133 on the user's computer 101.

In one embodiment, system 100 includes a central server system 106, a client application 102 and a retail system 104.

Client application 102 is configured to run on a computer 110 belonging to a user 101. In the case of user 101 having an FYE Download Zone, iTunes and/or similar account, computer 110 is preferably the computer onto which the user installed the iTunes or similar software. Typically, this computer will have a collection 133 or "library 133" of protected digital content that has been purchased from a digital content provider, such as the FYE or iTunes on-line store or other on-line store.

Client application software 102 may be acquired from a web site or from physical media or could even be acquired from the user's portable media player 150. In some embodiments, once installed, client software 102 inventories all of the attributes of the user's digital media accounts and all the attributes of any portable device that may be associated with computer 110. This information includes the attributes related to services that the user 101 uses to get his or her digital content. Such services may include the FYE Download Zone service, the iTunes service, the Napster service, and/or other digital content service.

For example, client application 102 may gather log-on information (e.g., user name and password) used to log onto services provided by digital content providers (e.g., FYE Download Zone logon information), as well as the physical id of computer 110 and any portable device that is associated with computer 110, such as portable device 150. Client 102 may also obtain or create a list of all "creative content" (e.g., music files and/or video files, etc.) stored on the hard drive of computer 110. Similarly, client 102 may generate a copy of all the music playlists stored on computer 110. Further, client 102 may keep a record of the content the user plays the most often, the most recently played content, the user's favorite playlists, and/or any other information that can be used to determine the user's preferences.

Some or all of this information may then packaged into a meta-credential token file 180 (a.k.a., "token file 180" or "token 180"), which may be encrypted and placed on the user's portable device 150. Additionally, some or all of the gathered information may be sent to central server system 106, which may include one or more servers.

Central server system 106 may provide a central repository for digital assets, as well as an off-premise registry for all digital content owned by user 101 as well as other users. This registry is not specific to any particular digital music service and, thus, can include multiple services and devices. Accordingly, central server system 106 can be considered an offsite backup of all user 101's protected digital assets, regardless of the service from which user 101 acquired the digital asset.

In the case of a hard drive failure or simply the replacement or upgrade of a PC, client application 102 may be configured to have a restore function that restores all the licenses and associations with portable players to the user's computer. Once the licensees are restored, the digital content associated with each license can be automatically downloaded from their original source.

Another possible function of client application 102 is that it may facilitate the creation of a home media network. As devices on the home network have to be registered and linked to an account, the token file 180 could be read by other computers in the trusted network and automatically configure those machines to work with the others in a digital media setup.

Implementation

User 101 may be provided with client application 102 in any number of standard mechanisms, ranging from an installation program on physical media, downloaded from an Internet site, or automatically installed from the user's portable device through a wired or wireless connection. As explained above, once installed the client application 102 may gather information used to manage the user's content services—this information may include user name, and password logon information, special configuration instructions, payment options such as credit card or debit account, preferred encoding format and licensing options, etc.

Because much of this information may have been previously input by the user as part of service setup, client application 102 may gather information automatically where possible. Mechanisms for automatically gathering the user's account information may include: (1) accessing a credential database, (2) acting as a proxy to network services and recording the user's preferences and logon information, and/or (3) downloading credentials from other network security services.

Where information is not available for automatic gathering, client application may display a graphical interface 172 that allows the user to manually input data (e.g., information identifying the user's favorite playlists). During the one time process of setting up client application 102, the user may be prompted for a unique password (e.g., a PIN) as well as a user name. The user may need to supply this information, for example, when the user wants to access his/her information maintained at central server 106. This aggregation of account information, user preferences, and/or logon data will be termed the token meta-credentials.

After the user selects a username and password, client application 102 may create an account for the user at the central server 106 and generate a security key, or access a previously created account and retrieve an existing key. All saved information may be encrypted with a strong algorithm, for example an RSA 128-bit key, although the implementation is arbitrary. The private key may be stored in a secure location on the customer's home computer, as well as sent in an encrypted, secure session to the central server 106. The usual mechanisms for retrieving the key in the event the user no longer has access to the key may apply, for example asking personal questions, verifying address and telephone number, or biometric identification where available.

An additional cryptographic key may be used by client application 102 to sign the token file 180, to ensure the integrity and authenticity of the file. This key may be intrinsic to client application 102, but can be updated dynamically from the central server 106 as needed in the event of version control, compromised security, or other requirements.

The token file 180 may be stored on any portable device available to the user (e.g., device 150), whether the device is physically or wirelessly connected to computer 110. Thus, the token file 180 may be stored on any number of portable devices, obviating the need for the user to remember individual account information, as well as able to access this meta-credential at the central server 106 via standard means such as HTML web browsers, mobile phones, PDA's, or similar systems.

Communication with central server 106 may be trigged in a number of ways. For example, the user may directly launch the client application 102 on his computer 110. The client application 102 may present a graphical interface to the user directly, allow the user to select content of any type, and proceed to purchasing, sampling, or other transactional activities. In this scenario, the user would have the meta-credentials present with the client application 102, so a simple logon would suffice. In other scenarios, the user might activate the central server 106 on his mobile phone through proximity to an access point using technologies such as Bluetooth or WIFI. The access point would detect the presence of meta-credentials on the phone, through a number of possible implementations. A radio-frequency tag (RFID) would be another method.

Figure 2:
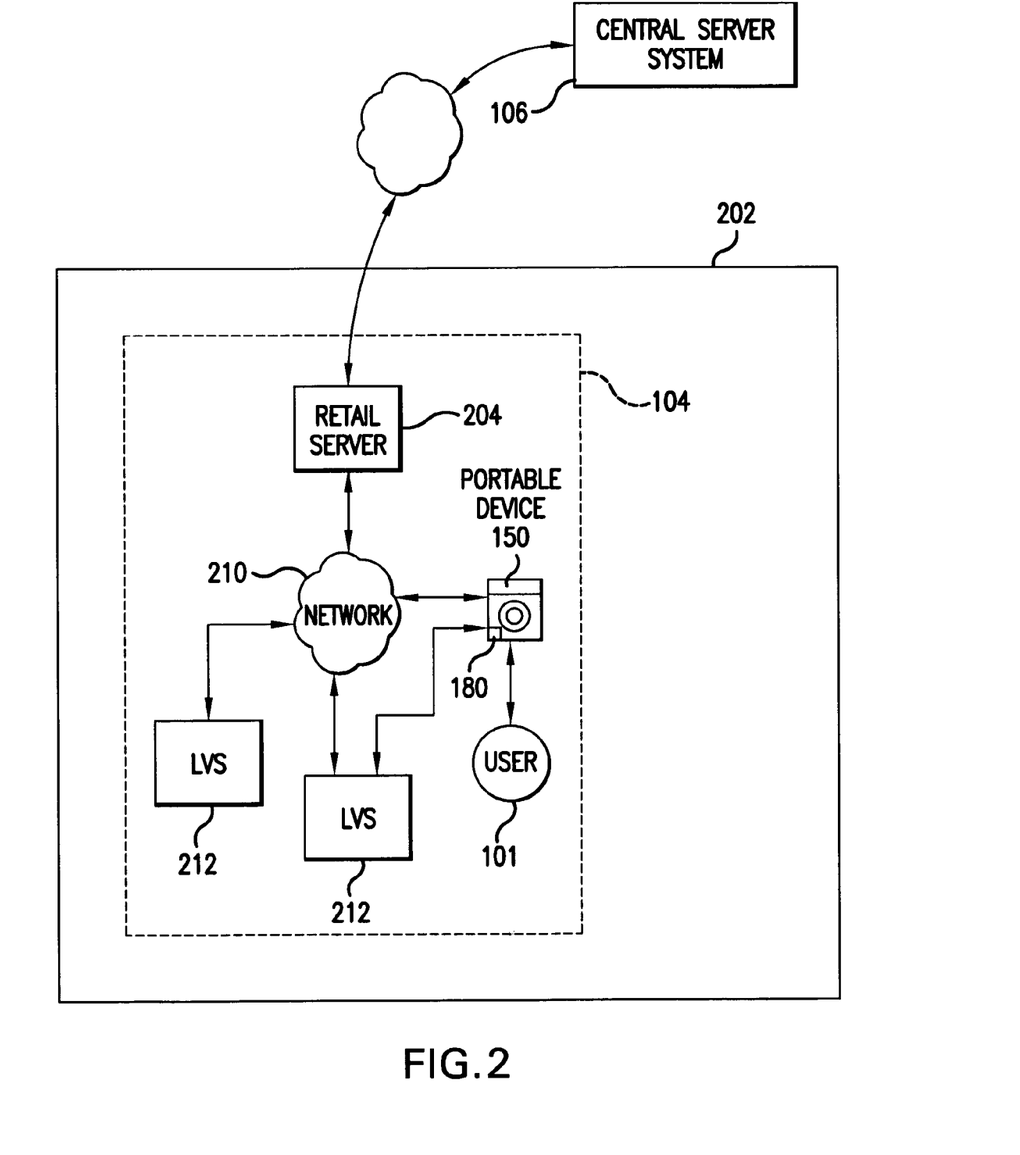
FIG. 2 illustrates one embodiment a retail system 104.

Referring now to FIG. 2, FIG. 2 illustrates one embodiment of retail system 104. As illustrated in FIG. 2, retail system 104 may be located within a retail store 202 that is generally accessible to the public. Retail system 104 enables user 101 to purchase digital content while in the retail store and place the purchased digital content on the portable device 150 that the user has brought into the store. Preferably, if portable device 150 has a content library stored thereon, the digital content is included in the content library.

As an example, user 101 may communicatively connect the portable device 150 to a server 204, which may be located within store 202, through, for example, a network 210, or by connecting (physically or wirelessly) to a listening and viewing station (LVS) 212, which is connected to server 204 though a network (e.g., network 210). This connection can be by means of a direct connect cable, or wirelessly by means of WIFI, Bluetooth, Infrared or other wireless systems.

Preferably, the server 204 constantly searches for any new devices connected to an LVS 212 or network 210. Upon detection of a new device, server 204 checks to see if the device has a token file 180 stored therein. If the token file is present, then the system 204 may retrieve the token file and open it. The token file may be locked requiring the user to authenticate by means of a password. Once the file is unlocked and opened, server 204 may know what type of device is present and the preferred encoding formats (e.g., the encoding formats the device can accept and play) because this information may be included in the token file 180. Server 204 may also know the user's account information, preferences, purchase history, preview history, etc., since this information may be stored in token 180.

The server 204 can then customize an LVS 212 user-interface screen to show only the content that is compatible and available for download to that particular device 150. User 101 can then browse and search for content that the user may wish to acquire. Additionally, server 204 can use the preference and/or history information stored in the token to make recommendations to the user.

Depending on the business model, the user may either download onto the user's device 150 special free promotional content, subscription content (assuming the user has a valid and active subscription), and/or purchase an item (e.g., a track from a CD, an image, a music video, a ringtone or other item).

With respect to purchasing an item, depending on the way the user account is set up, the user may bill the purchase to an account, which may be identified in the token file 180, or can pay for the purchase at a point of sale or directly at an LVS 212 using a credit card, stored value card, debit card, etc.

Once the payment or subscription status has been verified, the selected item may be downloaded to the user's device 150 in the appropriate format (e.g., in an encoding format that matches the preferred format identified in the token file). At the same time, server 204 may communicate purchase information to central server system 106 and/or update a purchase history stored in the token to reflect the new purchase. The information communicated to system 106 may indicate that the user 101 now has additional items and licenses that have been purchased.

Because server 204 may have information about the user's computer 110 (this information may be stored in token file 180), if a DRM system requires a license customized for that users computer 110, a license customized for that users computer 110 (and other trusted PCs) may be generated and placed on the portable device 150 together with a license for the portable device. The content so acquired will then be playable immediately because the license for the portable device will be of the same format as if the content came directly from the trusted machine 110. The token file 180 may enable server 204 to simulate the connection to the PC 110 such that the portable device 150 will think it is connected to the primary machine and not server 204.

When the user returns to his/her home and synchronizes the portable device with the media player on computer 110, the new items acquired from retail store 202 may be detected. However, because there is no license stored on the computer 110 corresponding to the new items, the media player on computer 110 can not play the new items. Depending on the DRM schema, in most cases, the license generated by retail system 104 and placed on portable device 150 is transferable to computer 110 and recognized by the media player.

Where the license transfer is not possible, the client application 102 may acquire the license from central server system 106 and store the license on computer 110 and register that computer as being authorized to play that content.

Should the user try to transfer a copy of the item to a device that is not registered, the license may not be issued. In such a case, although the item could transfer, the item may not be playable without a valid license because the item is DRM protected.

As discussed above, the token file could also be used as a CRM tool. Because the token may be used to store information on licenses acquired and owned it can provide a CRM system with data that could be used to suggest complimentary content. Additionally the meta-credential token could include a file listing of all the content on the users PC, protected or not, as well as information on the frequency of play, (the frequency of play or rating systems are popular features of most music jukebox programs). With that additional information the retail system 104 can make suggestions for content that are based on the users actual content preferences as opposed to generalizations such as "customers who purchased xyz also purchased abc." This function can be set up as an opt-in feature on the client application. Alternatively the recommendation feature could be powered solely by the purchase history of the user. Additional promotion features could be enable such as frequent shopper points automatically being added to the token file or stored in the retail computer master database.

Client 102 may also be used to configure any new device. For example, if the user purchases a new digital media player device, the user may connect the media play to computer 110 and use client 102 to automatically configure the media player. For example, because client 102 may store information identifying the user's favorite playlists, client 102 may, upon request, automatically store on the media player the user's favorite playlists, as well as all of the content (e.g., tracks) identified in the playlists. Additionally, client 102 may store the token file on the new media player.

Figure 3:
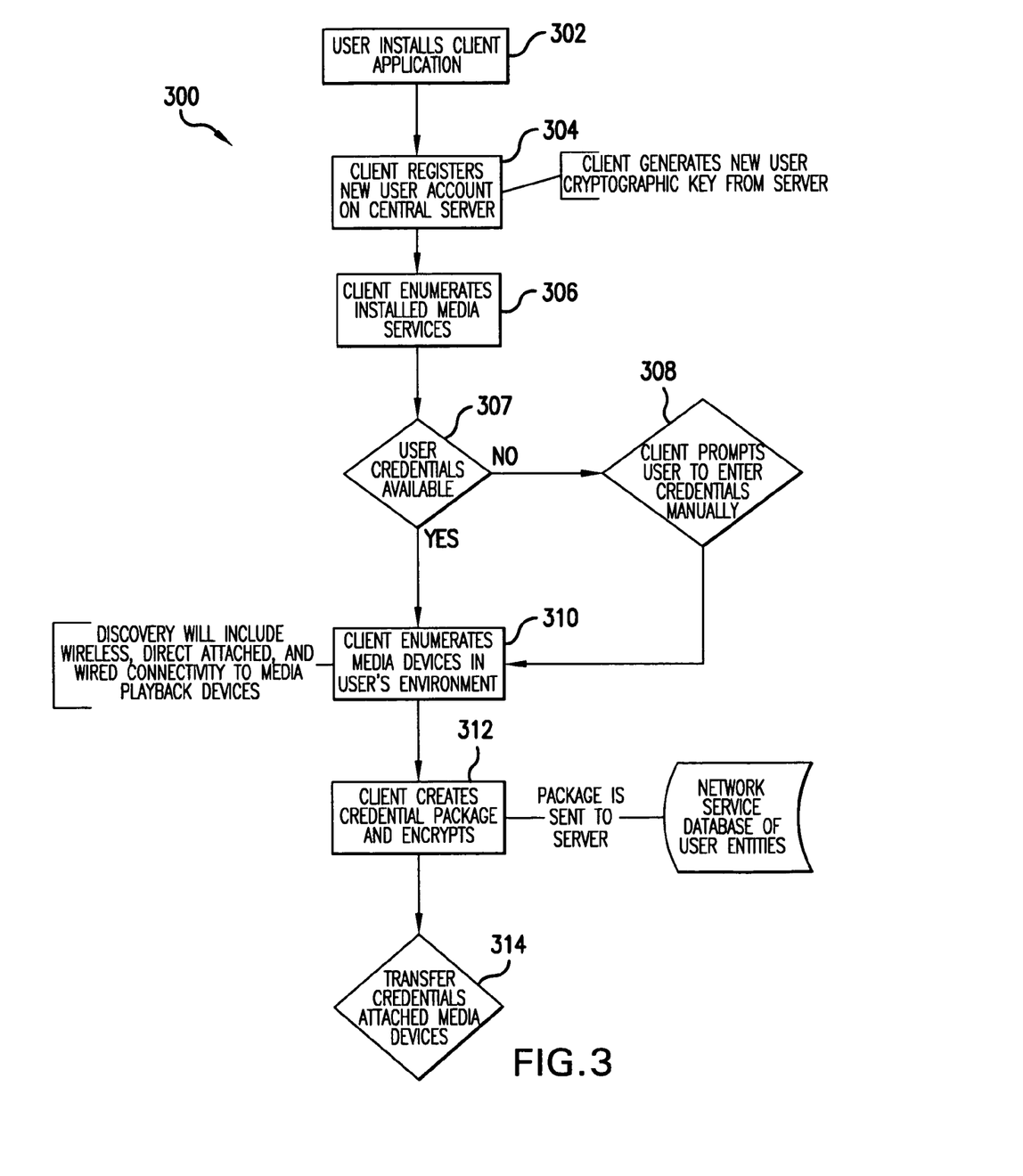
FIGS. 3-7 are flow charts illustrating methods according to various embodiments of the invention.

Referring now to FIG. 3, FIG. 3 is a flow chart illustrating a process 300 according to one embodiment of the invention. Process 300 may begin in step 302, where user 101 installs the client application 102 on computer 110, via a web download or installation media such as a CD.

In step 304, client application 102 communicates with central server system 106 to create a central account for the user. If the user already has a central account, client application 102 retrieves information from central server 106. Authentication will be required, either from a shared secret (password), or a typical series of identity questions. Client application 102 will then generate a crytographic key for the user, or retrieve a previously generated key from the central server. This key will be used to encrypt information subsequently managed by the client 102. The key will be shared with central server 106, via a secure session (SSL) to preserve a secure channel. A number of crytographic algorithms will be available, for example a RSA or elliptic curve standard. If the computer 110 does not have access to central server 106, a temporary key will be generated and used until the full account registration is possible. A unique number is associated with the user registration, and is delivered to the client.

In steps 306-308, client 102 gathers information regarding media services installed on the computer 110. For example, if the FYE Download Zone software is installed, client 102 gathers information regarding the user's FYE Download Zone account. Similarly, if the iTunes software is installed, client 102 gathers information regarding the user's iTunes account.

How the information is gathered may depend on the particular operating system executing on computer 110. For example, if Windows XP is running on computer 110, client 102 may examine a registry for installed services, and extract account data and preferences for any discovered services. Some of this data may be located in protected storage; however, the client may operate with the current user's security context in order to access this information. In addition, for services that do not have account, password, and preferences stored locally, the client may assist the user in retrieving this information from the services, typically using an email message.

In step 310, client 102 gathers information regarding portable devices attached to computer 110. Some portable devices may be attached via USB, USB2, or 1394 Firewire; standard host system APIs will allow enumeration of such devices. Other devices are accessed via wireless protocols. If computer 110 has a Bluetooth stack available, client 102 may query for Bluetooth devices in the vicinity. Client 102 may query IP addresses directly on the local subnet to discover WiFi attached devices, or tethered Ethernet devices.

The client may also search for additional devices such as mobile phones using information present in the registry or dial-up networking. Each discovered device may be queried for version, capabilities, and preferences. Certain devices may support relevant profiles for media use, such as Windows MTP compliance, Bluetooth audio, or USB mass storage. The client may prompt the user to enter any information on services that were not discoverable, as well as devices that are not currently attached or discoverable. As discussed above, client 102 may gather or create additional information, such as playlist information and other information pertaining to the user's preferences.

In step 312, the service credentials, device information and possibly other information are then stored in a file 180 (a.k.a., the "token file") on the local system. The token file is preferably encrypted using the crytographic key. The encrypted token file may be sent securely to the central server system 106. The token file may be constructed with a unique client identification number as the first field in the file. The file is then signed with a global cryptographic key to ensure data integrity of the file.

In step 314, where possible, the encrypted token file is transferred to each portable device that is communicatively connected to computer 110. For devices that support mass storage, a simple file may be created on the device with a predefined name ("twec.smc") or similar using USB or 1394 protocol. For devices that support Windows Media MTP, a similar file is transferred to the device storage space using the correct transport (USB, 1394, Bluetooth). For mobile phones, Bluetooth transfer of the encrypted data is available.

Optionally, an active application client can be installed on each portable device in conjunction with the secure token file. This application can assist in publishing the device capabilities to retail system 104, by responding to a discovery probe in an active manner.

After process 300, computer 110 and portable devices are now prepared for interoperation with the retail system 104.

Figure 4:
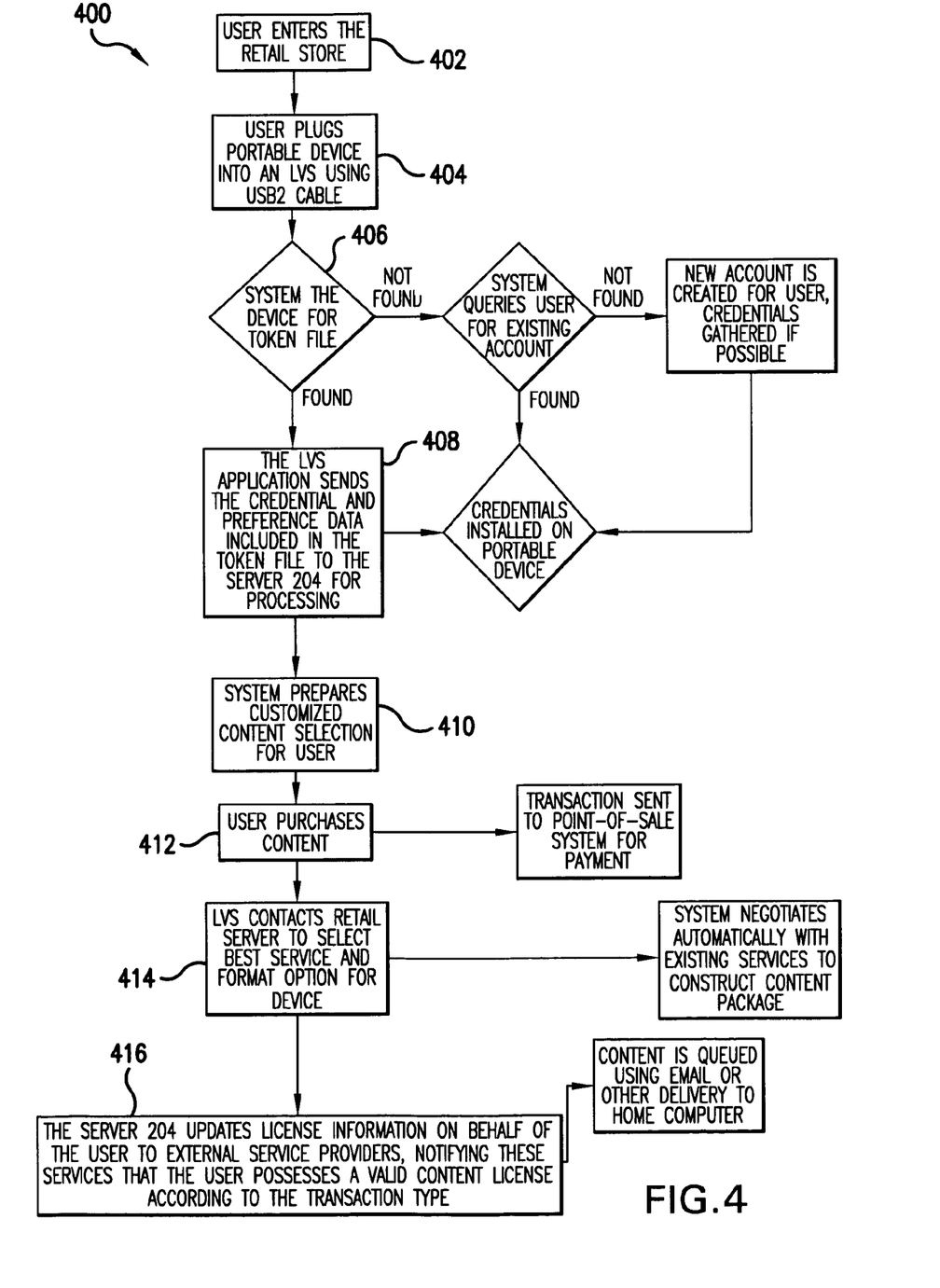

Referring now to FIG. 4, FIG. 4 is a flow chart illustrating a process 400 according to an embodiment of the invention. Process 400 may begin in step 402, where the user 101 enters a retail location carrying a portable device 150 (see FIG. 2).

In step 404, the user connects the device 150 to an LVS 212 using a physical cable (it is contemplated that portable device may also connect wirelessly). The LVS 212 receives the event of a device connection.

In step 406, a process running on the LVS 212 queries the device for a token file 180. The integrity of the token file is then checked using the cryptographic key to ensure there has not been any authorized alteration of the file.

In step 408, the LVS application sends the credential and preference data included in the token file to the server 204 for processing.

In step 410, the server 204 returns a personalized dataset based, at least in part, on the preferences information included in the token file 180, and the LVS application displays a graphical user interface that includes the personalized dataset.

In step 412, the user uses the user interface to browse a catalog of content available, samples as desired, and then selects some item to acquire. This acquisition can be arbitrary, i.e. rental, demo or trial, purchase, etc.

In step 414, the LVS application sends the user's selection to the server 204, using, for example, an XML compliant network call, and the server 204 determines the most efficient mechanism to deliver this item and places the purchased item on the portable device (and any required licenses). The delivery options include: (1) brokering the transaction to a $3^{rd}$ party service for fulfillment, (2) creating a target format and DRM license for the user's device, (3) delivering multiple packages to the user's device for later use on the home network, possibly on alternate device types, and (4) the item format and DRM can be multi-valued, so a set of content packages can be transferred to the portable device.

In step 416, the server 204 updates license information on behalf of the user to external service providers, notifying these services that the user possesses a valid license according to the transaction type.

As shown in FIG. 4, additional steps not described above may also be preformed as required.

Figure 5A:
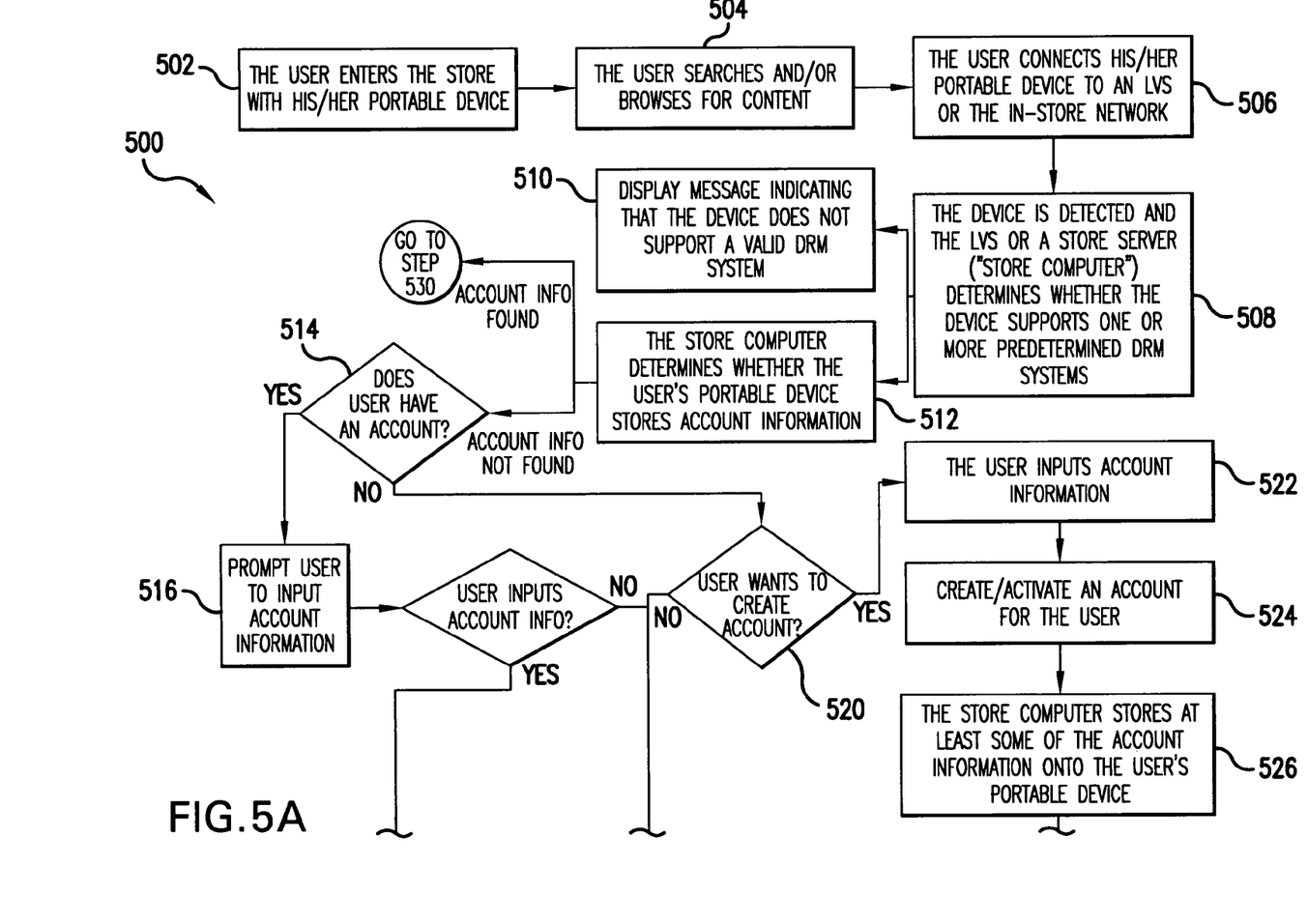
Figure 5B:
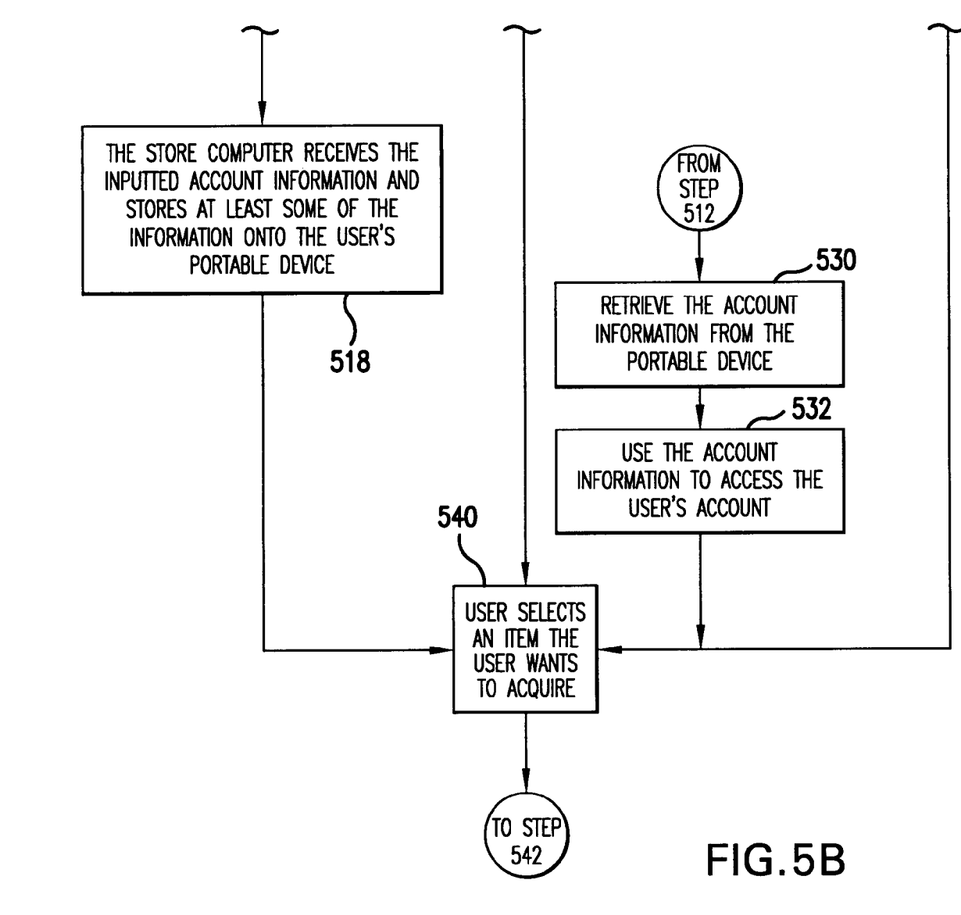
Figure 5C:
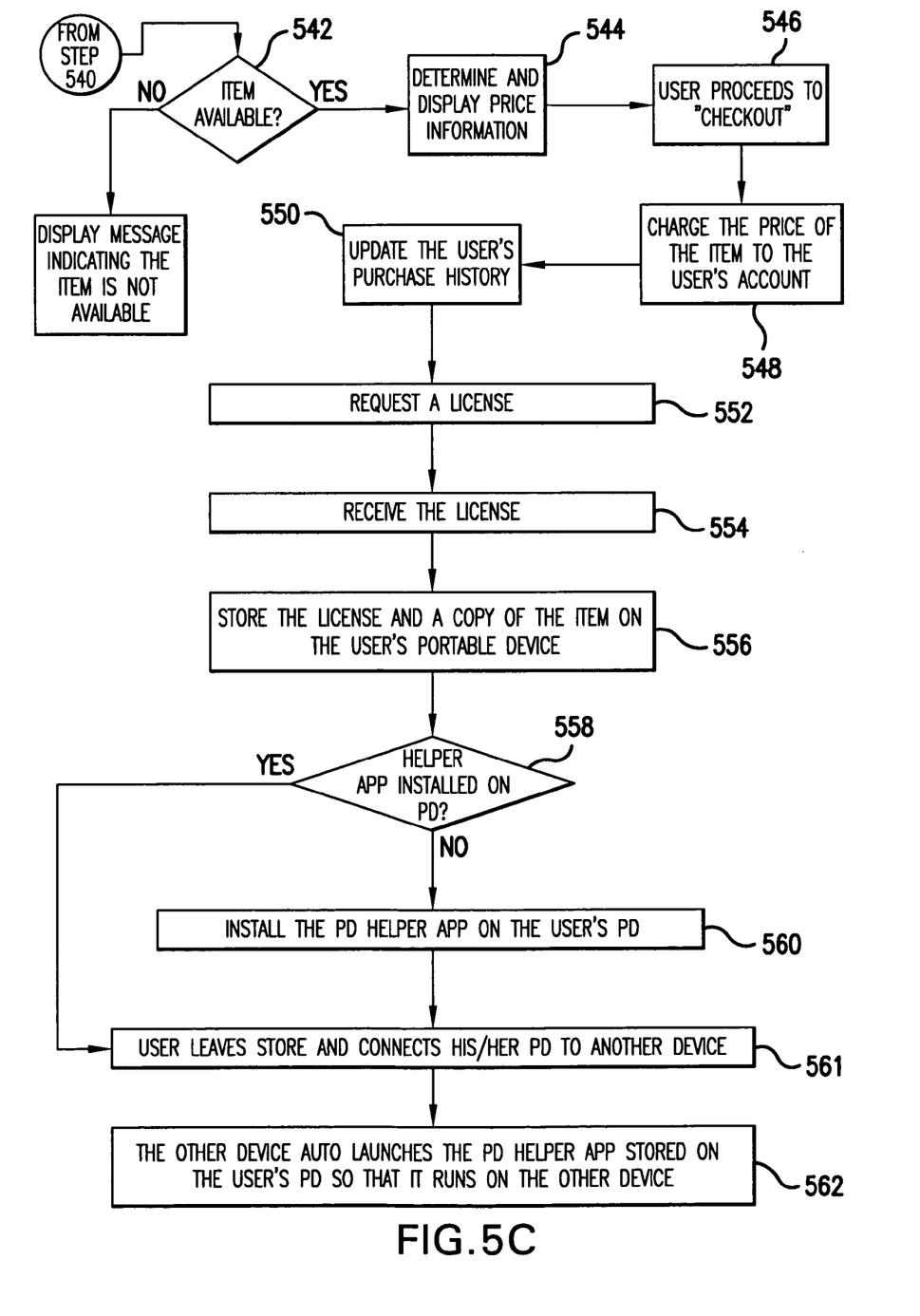

Referring now to FIGS. 5A-C, FIGS. 5A-C show a flow chart corresponding to a process 500 according to another embodiment. In step 502, user 101 enters a store (e.g., store 202). In step 504, user 101 searches/browsers for content using an LVS 212. In step 506, user 101 connects (physically or wirelessly) a portable device 150 to the LVS 212. In step 508, the LVS 212 or server 204 detects the connection and then determines whether the device supports a DRM scheme that is supported by store 202. If the user's device does not support a supported DRM scheme, then (step 510) a message may be displayed to the user on the LVS 212 indicating that the device is "not compatible," otherwise the process 500 may continue to step 512.

In step 512, the LVS 212 or server 204 determines whether particular account information (e.g., account information associated with a customer loyalty program or frequent shopper program or some other account) is stored on the user's portable device 150. In one embodiment, this determination is made by determining whether a particular file (e.g., token file 180 or other file) is stored on the device 150, and if so, determining whether the file includes the particular account information. If the particular account information is not found on the user's device 150, then process 500 may proceed to step 514, otherwise to step 530.

In step 514, the user may be asked whether he/she has an account. If the user indicates that he/she does not have an account, process 500 may proceed to step 520, and if the user indicates that he/she has an account, then (step 516) the user may be prompted to input into the LVS account information (e.g., a username or account id).

If the user does not want to enter the account information, then process 500 may proceed to step 540, otherwise (step 518) the user inputs the requested account information and the LVS 212 or server 204 stores at least some of the entered information (e.g., an account identifier identifying the account or username and password associated with the account) onto the user's device 150. For example, the information stored onto the user's device may be placed into a token file 180.

In this way, the next time the user connects device 150 to an LVS 212 or network 210, the LVS 212 or server 204 will have access to the account information stored on the portable device. Prior to storing the information onto the device, the LVS 212 or server 204 may verify that the information entered is associated with a valid account. After step 518, process 500 may proceed to step 540.

In step 520, the user may be given the option to create an account. If the user does not want to create an account, then process 500 may proceed to step 540, otherwise (step 522) the user inputs into the LVS 212 account information (e.g., the user may input his/her name and e-mail address and also select a password (e.g., a PIN) for the account). Other information may also be inputted.

In step 524, the inputted information is used to create or activate an account. For example, the information may be stored in one or more databases. The one or more database may include a first database located in the store 202 and/or a second database located outside of the store (e.g., at a location remote from the store). The second (remote) database may be part of central server system 106. The first and second databases may be part of a customer relationship management (CRM) system.

In step 526, the LVS 212 or server 204 stores information associated with the account (e.g., an account identifier identifying the account or username and password associated with the account) onto the user's device 150. For example, the information stored onto the user's device may be placed into a token file. In this way, the next time the user connects device 150 to an LVS 212 or network 210, the LVS 212 or server 204 will have access to the account information stored on the portable device. After step 526, process 500 may proceed to step 540.

In step 530, the account information stored on the user's device 150 is retrieved by the LVS 212 or server 204. In step 532, the retrieved account information is used to access the account information stored in a database (e.g., a local CRM database or a remote CRM database), which account information may include the user's name and other information (e.g., purchase history, play history, preferred encoding formats, etc.). If the account information includes the user's name, then a welcome message may be displayed on the LVS 212. For example, the message may say, "Welcome to the Store, Jane." If the account information includes "points" information for a frequent buyer program, the message may also say, "You have X number of points in your account." After step 532, process 500 may proceed to step 540.

In step 540, the user may interact with user interface screens displayed on LVS 212 to select an item that the user wants to acquire (e.g., purchase, rent, etc.). The user interface face screens may be generated based, at least in part, on at least some of the account information.

In step 542, in response to the user selecting an item for acquisition, the LVS 212 may transmit to server 204 an identifier identifying the item and server 204 may then determine whether the item is available to be acquired.

For example, server 204 may search a local content database for the item, and, if the item is not found, then request the item from a remote server. If the selected item is not stored locally and cannot be obtained from a remote server, then the user will not be able to acquire the item at that time.

If the item is stored locally or can be obtained from a remote server, then (step 544) server 204 may determine the price of the item and display the price to the user and place the item in an electronic shopping cart. Additionally, if the user has an account as described above, server 204 may update an item selection history associated with the account to include the item selected by the user. The user may select other items to add to the user's electronic shopping cart.

When the user is ready to purchase the items in his/her shopping chart, the user may select a "checkout" button displayed on an LVS 212 user interface (step 546). In some embodiments, in response to the user selecting the "checkout" button, an account associated with the user is automatically debited the appropriate amount (step 548). In other embodiments, the user may pay for the items in the store (there are numerous ways that payment can be handled). In other embodiments, the user may acquire the items for free or in consideration for providing information about the user to the store.

In some embodiment where the user acquires an item in the store for free and the item is placed on the user's portable device together with a license that enables a player on the portable device to play the item stored therein, the user is not able to play a copy of the item using another device or player without either making a payment or providing some information (e.g., an e-mail address and/or demographic information) to a license server.

In step 550, data pertaining to the user's purchase history may be updated to reflect the content purchased by the user. For example, central server system 106 may include a purchase history database that contains customer purchase history information. Thus, in some embodiments, in step 550, retail server 204 may transmit the user's purchase information to central server system 106 so that the user's purchase history information can be updated to reflect the recent purchase. Additionally, if purchase history information is maintained on the portable device, then that information may be updated to reflect the recent purchase.

In step 552, a license is requested from a license server 190 (see FIG. 1). For example, server 204 may transmit a license request to the license server 190. In step 554, a license for the purchased item is obtained from the license server 190 (e.g., the license server 190 transmits the license to server 204). Preferably, the license enables the user to play the item on the user's portable device and only on the user's portable device. Without the license, the user would not be able to play the item on the portable device.

In step 556, the license and the acquired item, which is preferably encrypted, are stored on the user's portable device 150 while the portable device 150 is connected to an LVS 212 or network 212. The user can now use the portable device 150 to play the item.

In some embodiments, in step 556, in addition to the license and item being stored on the user's portable device 150, a keyid, a transaction code and/or the address of the license server 190 are also stored on the portable device 150. In some embodiments, the encrypted item has a header portion and the key id, transaction code and the address of the licenser server are stored in the header portion of the item.

In embodiments where a transaction code is also stored on the portable device 150, the transaction code may be generated or obtained by, for example, retail server 204, central server system 106 or license server 190. If the transaction code is not initially generated or obtained by the license server 190, then, preferably, the transaction code is transmitted to the license server 190, for example, when the license is requested from the license server 190 (see step 552). The transaction code can be or include a randomly generated number, a randomly generated string, an identifier associated with the user, an identifier associated with the item, etc.

In some embodiments, before the user disconnects the portable device 150 from the LVS 212 or network 210, a check is made to determine whether a "PD helper application" is stored on the portable device 150 or whether the latest version of the PD helper application is stored on the portable device 150 (step 558). If the PD helper application or the latest version of the PD helper application is not stored on the portable device, then (step 560) the latest version of the PD helper application may be stored on the portable device. As explained in more detail below, the PD helper application functions to simplify for the user the process of transferring to another device (e.g., the user's home computer) a copy of the item the user acquired while in store 202.

In step 561, the user may connect portable device 150 to another device, such as, for example, computer 110, for the purpose of transferring a copy of the acquired item to computer 110. In step 562, computer 110 may automatically detect that portable device 150 is connected and automatically launch the PD helper application.

Figure 6:
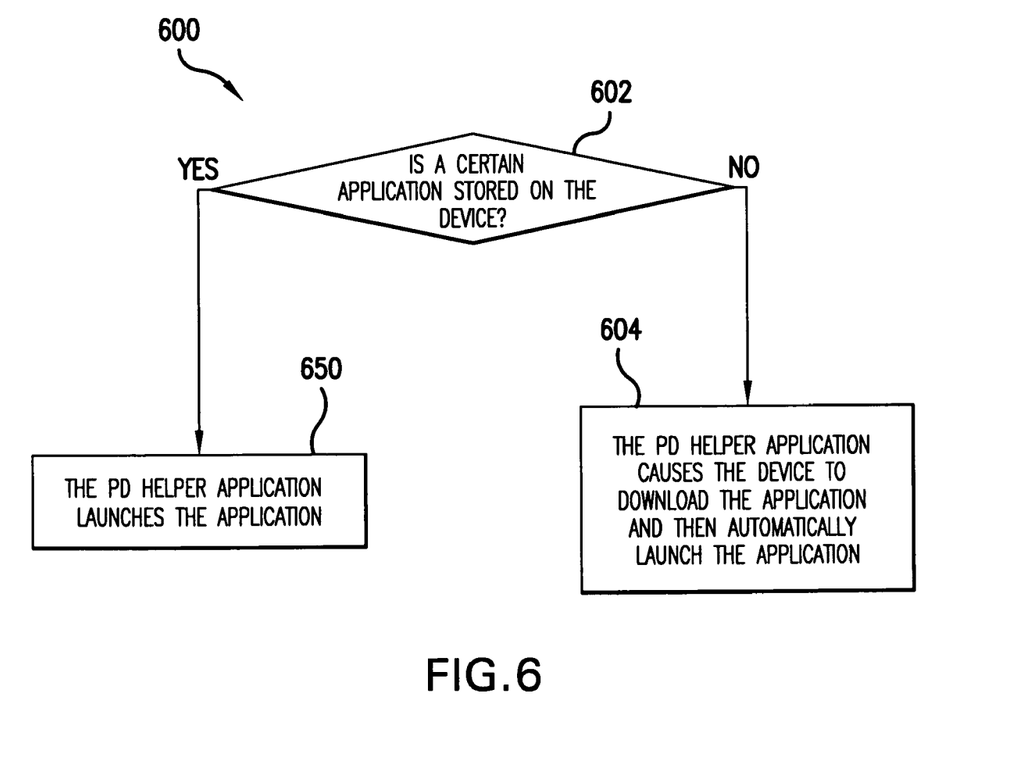

FIG. 6 is a flow chart illustrating a process 600 that may be performed by the PD helper application. Process 600 may begin in step 602 where the application determines whether application 102 is stored on computer 110. If so, process 600 proceeds to step 650, otherwise process 600 proceeds to step 604. In step 604, the PD helper application causes computer 110 to download from a remote server application 102 and then launch the downloaded application 102. In step 650, the PD helper application launches application 102 stored on computer 110 and then exits.

Figure 7A:
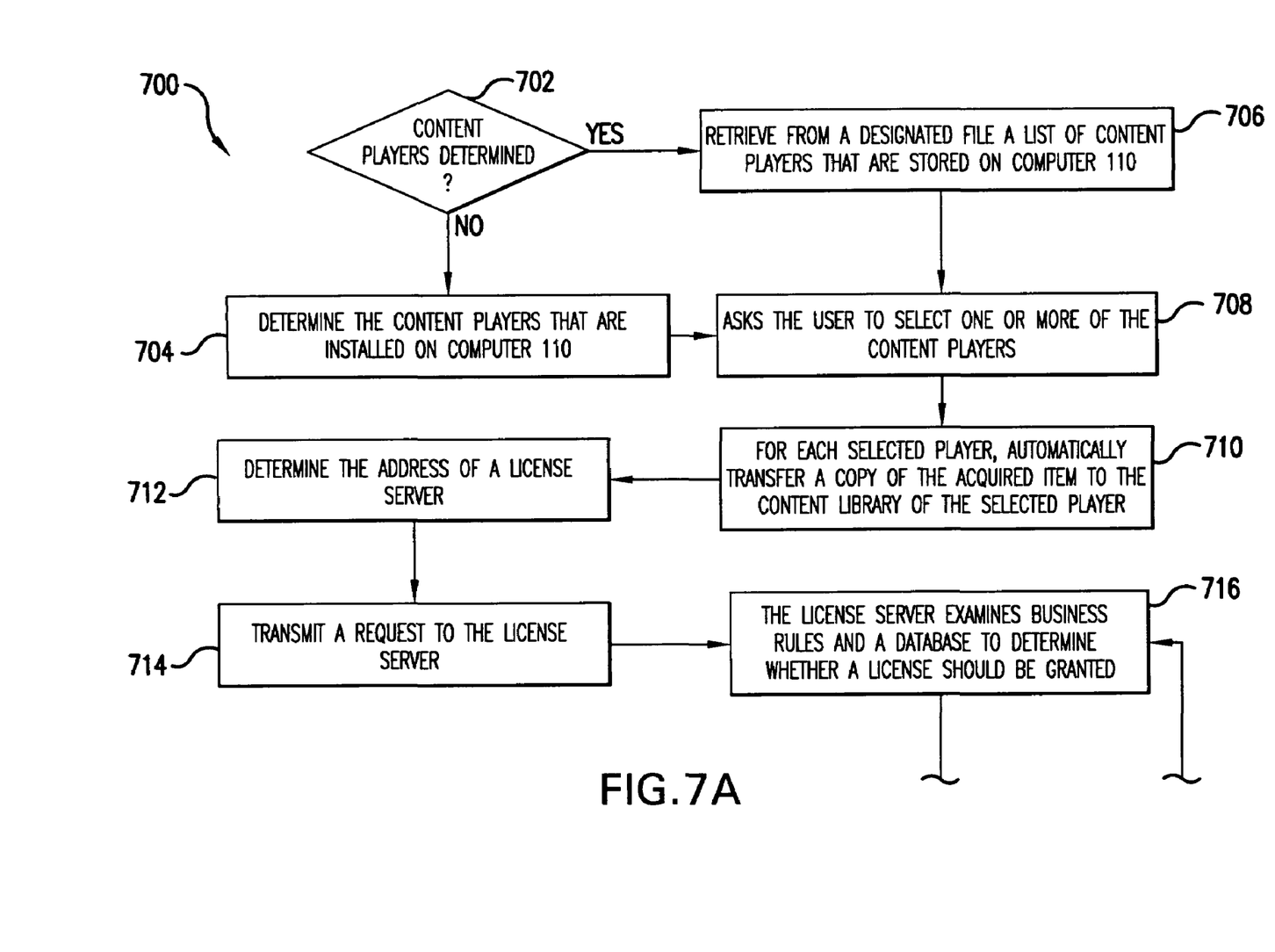
Figure 7B:
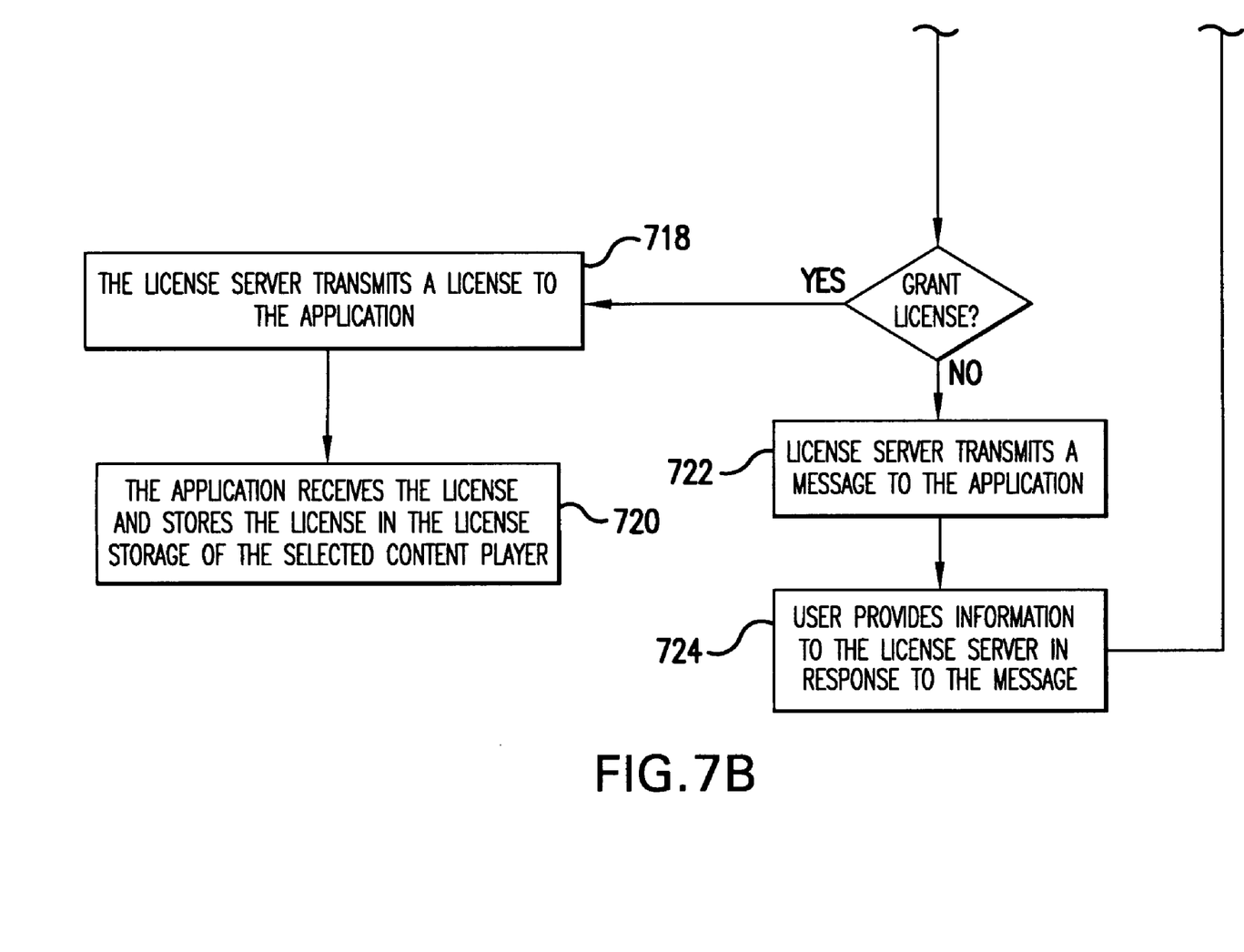

FIGS. 7A-B show a flow chart illustrating a process 700 that may be performed by application 102 stored on computer 110. Process 700 may begin in step 702 where application 102 determines whether it has previously determined the content players that are installed on computer 110. It may determine this by determining whether a designated file exists on computer 110. The designated file may include a listing of the one or more content players that are stored on computer 110.

If application 102 has previously determined the content players that are installed on computer 110, then process 700 may proceed to step 706. Otherwise, in step 704, application 102 determines the content players that are installed on computer 110. Application 102 may determine this by examining, for example, a registry or other database or other files. After step 704, process 700 may proceed to step 708.

In step 706, application 102 may retrieve from the designated file the list of content players that are stored on computer 110. In step 708, the application asks the user to select one or more of the content players. Each player may have a content library. In step 710, application 102, for each selected player, automatically transfers a copy of the acquired item to the content library of the selected player. In this way, the user does not have to manually transfer a copy of the item to the desired content library. This is advantageous because, for many users, finding where the desired content library is located can be a difficult task.

In some embodiments, after transferring a copy of the item to computer 110, application 102 "silently" obtains a license so that the acquired item stored on computer 110 can be played using computer 110. That is, application 102 obtains the license without charging a payment to a user's account and without requiring the user to perform any action or any action other than merely clicking a button or hyperlink; however, the user may be made aware of the fact that the application is obtaining the license (as a counter example, a system that requires a user to do something more than merely click a button or link, such as input information, as a pre-condition for obtaining a license does not silently obtain the license). Accordingly, in some embodiments, application 102 may perform some of steps 712-720.

In step 712, application 102 determines the address of license server 190 (e.g., the address may be included in the header of the item). In step 714, application 102 transmits a request to license server 190, which request includes information that enables license server 190 to determine whether a license should be granted. The information may include, among other things, the transaction code that was stored on portable device 150 in step 556. The information may also include a key id stored in the items header and/or an identifier that identifies the particular item.

In step 716, license server 190 may examine business rules and a database (or the like) to determine whether a license should be granted, wherein the determination may be based, at least in part, on the transaction code. For example, license server 190 may have a business rule that indicates that a license should be granted for a copy of the acquired item if the received request is the first received request that contains the transaction code and that includes a request for a license for a copy of the item, or license server 190 may have a business rule that indicates that a license should be granted if the number of licenses that have already been granted for copies of the item is less than X, where X can be set by the copyright holder. Accordingly, in some embodiments, license server 190 keeps track of the number of licenses granted for copies of the acquired item.

If a license may be granted, the process proceeds to step 718, otherwise to step 722.

In step 718, license server 190 transmits a license to application 102. In step 720, application 102 receives the license and stores the license in the license bank of the selected content player, thereby enabling the user to use the content player to play the copy of the item that was stored in the content player's library.

In step 722, license server 190 transmits a message to application 102. The message may take the form of a web page. For example, the message may take the form of a web page into which the user can input information (e.g., the web page may have one or more input fields into which the user can input information) or of a web page that directs the user to such a web page. The message may request that the user input account information (e.g., credit card information, a user identifier, an e-mail address, and/or other account information) and/or input preference information (e.g., it may request the user to input his/her favorite songs, movies, artists, books, etc.).

In step 724, in response to the message transmitted from license server 190, the user may input information to be transmitted to license server 190. After step 724, the process may proceed back to step 716, where license server 190 determines whether to grant a license. This determination may be based on the information inputted by the user in step 724.

In some embodiments application 102 does not acquire the license. In these embodiments, when the user first tries to play the content using a content player, the content player will request the license from license server 190 in the same manner as described above with respect to steps 712-724.

In some embodiments, application 102 stored on computer 110 may be a component of (e.g., a module of or plug-in of) another application stored on computer 110, such as, for example, a content player (e.g., iTunes or Windows Media Player, etc.). In embodiments where application 102 is a component of a content player, application may not perform steps 702-710, but, instead, may simply automatically transfer a copy of the acquired item to the content library of the content player of which application 102 is a component.

In one embodiment, instead of performing process 600, the PD helper application, which is stored on portable device 150, may perform some or all of the steps of process 700. In another embodiment, a PD helper application is not stored on the user's portable device and the user is required to manually download application 102 to computer 110. For example, before the user leaves store 202, the user may be provided with instructions for manually downloading application 102. Like the automatically downloaded application, the manually downloaded application may perform some or all of the steps of process 700.

While various embodiments/variations of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for enabling a user having a first device to acquire an item, comprising:
    (a) connecting the first device to a second device, wherein the first device is a portable device;
    (b) while the portable device is connected to the second device, causing the second device to request the item;
    (c) after step (b) and while the portable device is connected to the second device, receiving at the portable device a copy of the requested item, and storing the copy of the requested item on a first storage unit contained within or connected to the portable device;
    (d) determining that a helper application is not stored on the portable device and based on the determination then storing by the portable device a helper application on the first storage unit after step (a) and prior to the portable device being disconnected from the second device;
    (e) after step (d), disconnecting the portable device from the second device;
    (f) after step (e), connecting the portable device to a third device;
    (g) after step (f) and while the portable device is connected to the third device, prompting, by the helper application, the user to select at least one content player stored on the third device;
    (h) after step (g), receiving, by the helper application, a selection of a content player;
    (i) after step (h), storing, by the helper application, the copy of the item in a content library, stored in the third device, associated with the selected content player.

2. The method of claim 1, further comprising:
    (j) in response to a request to play the copy of the item stored in the content library, silently obtaining from a license server a license that enables the content player to play the item from the content library; and (k) storing the obtained license in a license store accessible to the content player.

3. The method of claim 1, wherein the second device is a device openly accessible to the public.

4. The method of claim 3, wherein the second device is located within a retail establishment.

5. A method for enabling a user having a first device to acquire an item, comprising:

(a) connecting the first device to a second device, wherein the first device is a portable device;

(b) while the portable device is connected to the second device, causing the second device to request the item;

(c) after step (b) and while the portable device is connected to the second device, receiving at the portable device a copy of the requested item, and storing the copy of the requested item on a first storage unit contained within or connected to the portable device;

(d) determining that a helper application is not stored on the portable device and based on the determination then storing by the portable device a helper application on the first storage unit after step (a) and prior to the portable device being disconnected from the second device; and (e) after step (d), disconnecting the portable device from the second device, wherein the helper application is configured to download a second helper application to a second storage unit that is contained within or connected to a third device after the portable device connects to the third device, wherein the helper application is configured to download the second helper application to the second storage unit substantially in response to a user connecting the first device to the third device and to a determination that the second helper application is not installed on the third device, and the second helper application is configured to store a copy of the item stored on the first storage unit in a content library stored in a second storage unit that is contained within or connected to a third device after the portable device connects to the third device.

6. The method of claim 5, wherein the second helper application is configured to prompt the user to select at least one content player and then store the copy of the item in the content library.

7. The method of claim 5, wherein the second helper application is configured to silently store a copy of the item stored on the first storage unit in a content library stored in a second storage unit that is contained within or connected to a third device after the portable device connects to the third device.

8. The method of claim 7, wherein the second helper application is configured to silently store the copy of the item in the content library substantially in response to a user connecting the first device to the third device and to a determination that no copy of the item is stored in the content library.

9. The method of claim 5, further comprising:

(f) after step (d), connecting the portable device to a third device;

(g) after step (f) and in response to a request to play the copy of the item stored in the second storage unit using a content player, silently obtaining from a license server a license that enables the content player to play the item from the second storage unit; and (h) storing the obtained license in a license store accessible to the content player.

10. The method of claim 9, wherein the second helper application is configured to store a copy of the item stored on the first storage unit in a content library stored in a second storage unit that is contained within or connected to a third device after the portable device connects to the third device.

11. The method of claim 10, wherein the second helper application is configured to prompt the user to select at least one content player and then store the copy of the item in the content library, wherein the content library is associated with one of the selected content players.

* * * * *